United States Patent
Young et al.

[15] 3,680,984
[45] Aug. 1, 1972

[54] COMPRESSOR COMBINED FLEXIBLE AND MAGNETIC DRIVE COUPLING

[72] Inventors: Robert R. Young, Murrysville; William A. English, Export, both of Pa.

[73] Assignee: Westinghouse Electric Corporation, Pittsburgh, Pa.

[22] Filed: July 23, 1971

[21] Appl. No.: 165,460

Related U.S. Application Data

[62] Division of Ser. No. 5,636, Jan. 26, 1970.

[52] U.S. Cl. ............. 417/420, 417/902, 64/15 C, 310/104
[51] Int. Cl. ....... F04b 17/00, F04b 35/04, F16d 3/52, H02k 5/10
[58] Field of Search ..... 417/420, 902; 64/15 C, 27 C; 310/104

[56] References Cited

UNITED STATES PATENTS

| | | | |
|---|---|---|---|
| 1,957,307 | 5/1934 | Von Ohlsen | 64/15 C |
| 3,335,942 | 8/1967 | Seigart | 417/902 X |
| 3,512,901 | 5/1970 | Law | 417/420 X |

*Primary Examiner*—Robert M. Walker
*Attorney*—F. H. Henson et al.

[57] ABSTRACT

This invention provides a flexible drive coupling mounted between a resiliently supported prime mover and a rigidly supported power take-off shaft. The prime mover in the instant application is a compressor and is situated in a hermetic enclosure so that a magnetic coupling means is provided between the flexible drive coupling powered power take-off shaft and an output so as to drive the output shaft mounted outwardly of the hermetic enclosure. This output shaft may conveniently mount a fan, belting or the like so as to receive its power from the prime mover.

8 Claims, 3 Drawing Figures

PATENTED AUG 1 1972 3,680,984

COMPRESSOR COMBINED FLEXIBLE AND MAGNETIC DRIVE COUPLING

RELATED CASES

This is a divisional of Pat. application Ser. No. 5,636, filed Jan. 26, 1970, owned by a common assignee and titled, "Combined Flexible and Magnetic Drive Coupling."

BACKGROUND OF THE INVENTION

1. Field of the Invention

The invention relates to a combination flexible and magnetic coupling arrangement disposed between a prime mover and an output shaft. More specifically, the invention relates to a driven coupling arrangement for a hermetically sealed and resiliently mounted refrigerant compressor where the driven coupling arrangement comprises a resilient drive means and a magnetic coupling so as to permit the driving of a fan or the like outwardly of the hermetically sealed enclosure.

2. Description of the Prior Art

In conventional refrigeration configurations providing relatively small refrigeration loads the system is generally hermetically sealed; that is, the compressor for the system is hermetically sealed within an enclosure and completely bathed in refrigerant gas so that fewer sealing problems are encountered and so that the compressor and driving electric motor may be properly cooled by the refrigerant gas. In this conventional kind of an arrangement the compressor is normally resiliently mounted so as to be flexibly supported within the hermetic enclosure to prevent oscillations and vibrations of the compressor from being transmitted outwardly of the enclosure. Although attempts have been made to utilize a power take-off arrangement from the crank arm of the compressor so as to compressor-drive some auxiliary or ancillary refrigeration equipment outwardly of the hermetic enclosure, such attempts have been generally unsuccessful due to the fact that an extremely complicated sealing arrangement is required for the rotating and oscillating driven shaft as it extends through the hermetic enclosure, proper.

In an attempt to obviate the foregoing problem the instant invention provides a resilient drive coupling connected between the resiliently mounted compressor and a relatively fixed but rotatable power take-off shaft. Although resilient coupling means are well known in the prior art that utilize a coiled compression spring disposed between a driven and a driving element, these resilient coupling arrangements have normally been provided so that the drive is imparted to and taken off the resilient coupling at substantially its periphery or circumference. This arrangement is used because the driving and driven elements are normally mounted in a substantially aligned non-oscillating manner relative to the resilient drive element which is attached to each. Further, although magnetic couplings have also been utilized to provide a driving arrangement between a driven and a driving element, the combination of a resilient driving coupling and a magnetic coupling arrangement mounted in tandem has heretofore not been utilized with the unforeseen advantages attendant thereto when placed in a hermetic compressor environment.

In view of the fact that, in a conventionally hermetically sealed refrigeration system, the compressor of the system is mounted in the hermetically sealed enclosure and is in an oscillating relationship within such an enclosure, it would be advantageous to provide an effective drive coupling means between it and any ancillary equipment outwardly of the enclosure so that the ancillary equipment could be advantageously and effectively driven by the compressor. Then, this coupling arrangement would not only have to be adapted to the oscillating drive afforded by the compressor but also afford an easy and convenient sealing arrangement for the driven shaft which extended through and outwardly of the hermetic enclosure.

SUMMARY OF THE INVENTION

The instant invention provides a coupling arrangement between a hermetically sealed compressor and a driven output shaft disposed outwardly of the hermetic shell, with this shaft advantageously utilized to drive a belt or fan or the like. The coupling arrangement is connected to the crank pin of the compressor to obtain from it the rotary motion needed at the output shaft. A flat member or arm member may be mounted on this crank pin so as to rotate with it and may have attached to it a resilient coupling in the form of a coiled, compression spring. This spring extends to a coupling member in the form of a magnetic coupling member fixed so as to rotate in a non-oscillating manner relative to and within the hermetic shell. The resilient compression spring has its end bent inwardly and then at a right angle relative to the inward extensions so as to provide two ends which extend concentric relative to the general axis of the spring. Each of the ends of the resilient spring are inserted, respectively, in the arm member and a hub of the magnetic coupling member. The spring is made with an extremely high lateral stiffness rate so that oscillations of the compressor, within its enclosure, on its resilient mounts which tend to axially misalign the compressor relative to the hub of the magnetic coupling tend to be suppressed by the resilient coupling means extending between the crank pin and magnetic coupling. The magnetic coupling, in turn, is arranged so as to drive an oppositely disposed and confronting magnetic coupling having a stub shaft extension which is disposed outwardly of the enclosure housing for convenient connection to, for example, a fan. Situated between the magnetic coupling members is a non-magnetic diaphragm which, essentially, forms a seal between the hermetically sealed compressor and outer magnetic coupling and insures that no refrigerant leak occurs outwardly from the hermetic enclosure so as to escape to atmosphere.

DESCRIPTION OF THE PREFERRED EMBODIMENT

Figure 1:
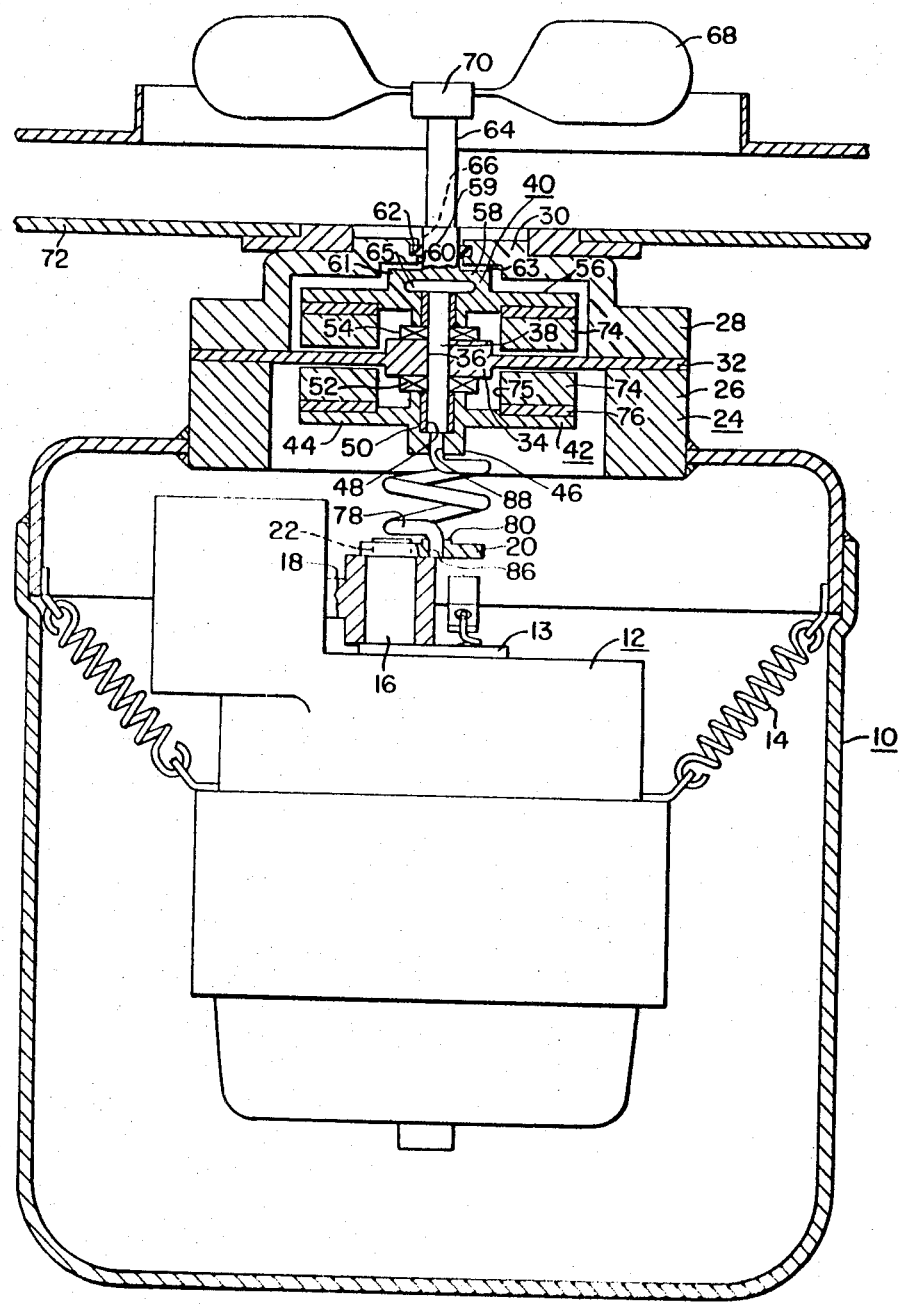
FIG. 1 is a side view, partly in cross-section, of the instant invention and the environment in which it is disposed.

There is shown in Fig. 1, a hermetically sealed shell 10 which envelops and encloses a compressor 12 that is conventionally resiliently mounted on a series of tension springs 14, 14, or 14. More than three springs may be utilized equally spaced around the general cylindrical shape of the enclosure 10, but three springs approximately equally spaced at 120° intervals are sufficient to balance the compressor 12 within the enclosure 10 and to prevent compressor caused vibration outwardly of the enclosure.

As is conventional, a crank shaft 13 is provided in the compressor 12 to drive a crank pin 16 mounted rigidly with it, which, in turn, drives the crank arm 18 of the compressor so as to provide reciprocating motion to the compressor piston (not shown) of the compressor 12. Mounted on the axially outer end of the crank pin 16 is a flat member 20 having a generally rectangular shape, with this flat member being placed in driven, rotative relationship with the crank pin 16 by means of a peened over portion 22 of the crank pin. The portion 22 is located at the extreme outer axial end of the crank pin 16 so as to be positioned in non-interfering relationship with the crank shaft 13 and crank arm 18.

A supplimentary housing part 24 containing the coupling arrangement of the instant invention is provided to seal the end of the enclosure 10 adjacent the crank pin 16. Supplementary housing part 24 is made up of an inner part 26 of generally hollow cylindrical shape and an outer part 28 which is generally cylindrical and hollow but includes a capped end 30. A diaphragm member 32 of a non-magnetic but impervious material such as stainless steel is disposed between the inner end and outer parts 26, 28 and has a generally flat, disc shape so as to provide a barrier against the exit of refrigerant gases from within the enclosure 10 outwardly beyond the diaphragm 32.

Centrally located in the diaphragm member 32 is a thickened, hub portion 34, with this hub containing a bore 36 that extends axially through the hub portion 34 and centrally located relative to it. A stub shaft 38 is fixedly disposed within the bore 36 by being press fitted or the like so as to extend axially outwardly therefrom in each direction for rotatably mounting, on these extending ends, a pair of magnetic clutch means 40 and 42. Magnetic clutch means 42 is the most inwardly disposed of the two clutch members and magnetic clutch means 40 is the most outwardly disposed.

Magnetic clutch means 42 is formed in the embodiment disclosed, from a generally disc-like member 44 having an axially centered hub 46 extending axially outwardly and inwardly from the body of the disc-like member 44. A blind bore 48 extends axially through a portion of the hub 46 and is dimensioned with a diameter larger than the diameter of the stub shaft 38 so as to permit the magnetic clutch means 42 to rotate relative to the stub shaft 38. A bushing 50 of a dissimilar metal than that making up stub shaft 38 and disc-like member 44 may be disposed over stub shaft 38 and in bore 48 so as to provide bearing and piloting arrangement for the rotation of the magnetic clutch means 42. Axially outwardly of the clutch means 42, a thrust bearing means 52 is disposed on the stub shaft 38 with this thrust bearing in abutting relationship with an axially inner face of thickened hub portion 34 of diaphragm member 32. This bearing means takes any axial thrust imparted to clutch means 42 during its rotation as driven by the oscillating compressor 12.

On the axially opposite face of thickened hub portion 34, another thrust bearing means 54 is disposed so as to absorb axially inwardly directed thrusts imposed on magnetic clutch means 40. The magnetic clutch means 40, similarly to the magnetic clutch means 42, is formed from a generally disc-like member 56 having a thickened hub portion 58, with a stepped portion 59 of the thickened hub portion extending outwardly axially relative to the axial extent of the enclosure 10 through a bore 60 formed in the end cap 30 of outer part 28. A convenient lip seal 62 is provided in this bore to prevent the intrusion of dirt or dust into the enclosure formed between the end part 28 and the diaphragm member 32. The lip seal 62 also serves to retain lubricant inserted inwardly thereof during assembly of the invention. This lubricant is disposed in the bore 60 inwardly of the lip seal and in the cavity formed between the outer part 28 of supplementary housing 24 and the diaphragm member 32. A transverse slot 65 in disc-like member 56 also serves as a distribution means for this lubricant.

Outwardly of the end cap 30 the thickened hub 58 mounts a stub shaft 64 for rotation with it, this stub shaft forming the output shaft of the coupling arrangement. Splines or the like (not shown) may be utilized for this connection disposed in a blind bore 66 of the hub provided for mounting stub shaft 64. The other end of this stub shaft conveniently mounts a fan 68 or the like with the fan having a hub 70 also splined or attached by a set screw, for example, to the stub shaft 64. As is conventional a fan enclosure (only shown fragmentarily) is provided for the fan 68. An enlarged portion 61 of hub portion 58 provides a face 63 which limits outward axial movement of clutch means 40.

Each of the magnetic clutch means 40 and 42 includes a magnetic material such as a ceramic magnetic material or a magnetic material sold under the trademark "INDOX" by the Indiana General Corporation, Magnet Division, Valpariaiso, Ind. This magnetic material is formed in the shape of a hollow cylindrical disc magnetic element and includes a backing plate 76 of the same inner and outer diameter attached to its one face, with the backing plate 76, in turn, then attached to either the disc-like member 44 or the disc-like member 56. It should be noted that a slight clearance is provided between the adjacent face of each of the hollow disc magnetic elements 74, 74 and the diaphragm member 32 and that the bore 75 formed in each of the hollow disc cylinders 74 and its attached reinforcing plate 76 is larger than the diameter of the hub 34 of the diaphragm means 32 so that the magnetic clutch means 40 and 42 may rotate without hinderance from it.

Figure 2:
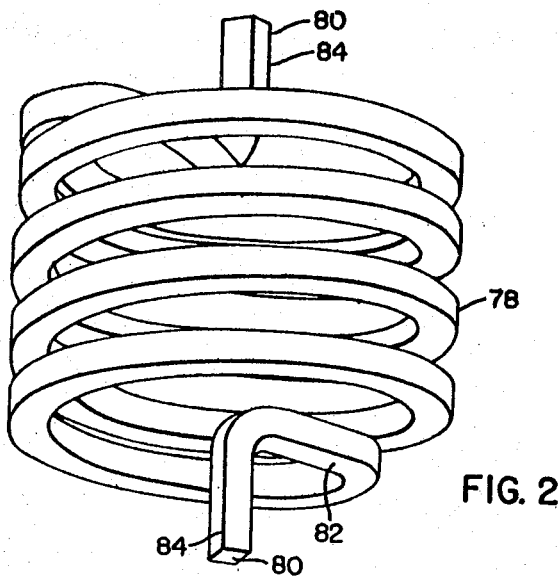
FIG. 2 is a perspective view of one type of resilient coupling means which may be utilized in the invention.
Figure 3:
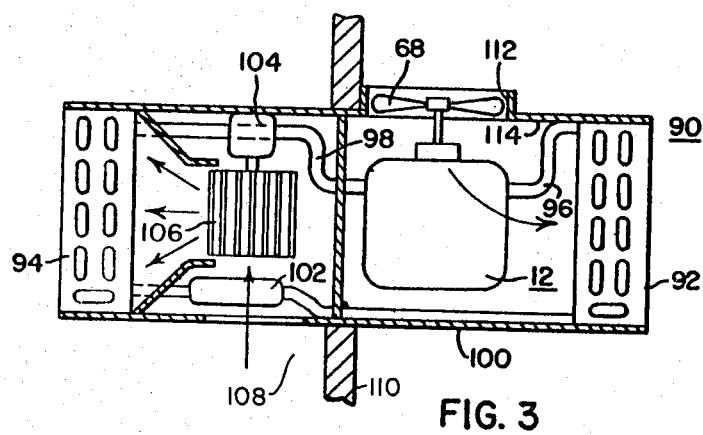
FIG. 3 is a schematic view of the invention as it might be disposed in an air-conditioning unit.

In order to provide a connection between the flat arm 20 mounted on the crank pin 16 and magnetic clutch member 42, a resilient spring means 78 is provided extending therebetween. This spring means is selected to have an axial stiffness low enough to allow noise and vibration isolation and a lateral stiffness high enough to allow concentric alignment of the magnetic coupling assembly with the compressor drive axis. In accordance with this desire, the terminating coils of the resilient spring means 78 have ends 80 (Fig. 3) which extend radially through the use of inward portions 82 and then axially parallel and concentric with the axis of the spring means 78 through the use of portions 84. The portions 84 thereby form a tang like means which is concentric with the axis of the spring 78, with this tang means having conveniently a square cross-section so that they may be mounted in square bores 86 and 88 (Fig. 2) formed in the flat arm 20 and hub 46, respectively. As is shown in Fig. 3, the entire spring 78 may be formed from a spring wire having a square cross-section so that the portion 84 does not require any further machining to provide a square cross-section. Because of the concentric alignment of the tangs 84 relative to the coils of the spring means 78 and the high lateral stiffness of this spring means it is extremely effective in tending to center the oscillating compressor 12 relative to the axis of rotation of the magnetic clutch elements 40 and 42, dampening out nearly all vibrations tending to misalign these elements during the compressor operation.

Because of the arrangement described, the hub 46 of the magnetic coupling means 42 forms a power take-off shaft means for the resilient coupling formed by resilient spring means 78. The resilient coupling, in turn, is driven by an output shaft means formed by the crank pin 16 and the flat arm 20. The power take-off shaft means drives the magnetic coupling means 40, 42 which include an output shaft fixed thereto which takes the form of stub shaft 64.

Turning to Fig. 4, the compressor 12 and the fan 68 driven thereby can be seen disposed in an air-conditioning unit 90. The compressor 12 is provided between a conventional condenser 92 and an evaporator 94 with a compressor discharge line 96 extending between the compressor 12 and condenser 92 and a compressor suction line 98 extending between the compressor 12 and evaporator 94. Another refrigerant carrying conduit 100 also extends between the condenser 92 and evaporator 94, as is conventional, with an expansion device 102 situated in this line to provide the required refrigerant pressure drop between the condenser and evaporator operating pressure.

A motor 104 drives a fan 106 which draws air from a space 108 being colled and circulates it over the cooling coils of the evaporator 94. The air conditioner 90 is placed so as to extend through a wall 110 so that the condensor 92 is outwardly of the space 108 and the heat discharged from the condenser 92 is to a heat sink such as atmosphere. Air for cooling the condenser is pulled from the heat sink through an entrance 112 opening thereto and circulated over the coils of the condenser 92 by a baffling arrangement 114 mounted around the fan 68. Thus, the compressor 12, through a novel and inventive coupling arrangement, drivingly powers the fan 68 to provide a circulating flow of cooling air over the condenser 92.

It should be clear from the foregoing description that the structure disclosed fully meets the objects of the invention and, although a specific embodiment has been detailed, many obvious modifications may be made therein by one skilled in the art without the exercise of the inventive faculty. For example, the compressor 12 could be utilized to drive a pair of fans, one being utilized to cool the compressor and the other being utilized to circulate air over the evaporator, by the extension of stub shaft 64 and the mounting of a second fan on this extension. Such a modification would, of course, require a suitable baffling to separate the air flow and lead them respectively to the condenser and evaporator.

We claim as our invention:

1. A resilient coupling member disposed between a driving means and driven means comprising; (a) a resilient spring means having a series of coils and extending axially between said driving and driven means, (b) said resilient spring means having tangs of square cross-section at the termination of its coils, (c) said tangs extending axially relative to the axial extent of said resilient spring means (d) said tangs also being concentrically aligned with the axis of said resilient spring means, (e) said tangs being drivingly rotationally connected to said driving and driven means, (f) said driven means comprises a first magnetic coupling member fixed to rotate with one of said tangs, (g) said driven means also comprises a second magnetic coupling member drivingly rotated by said first magnetic coupling member, (h) a non-magnetic diaphragm means is disposed between said first and second magnetic coupling member, (i) said non-magnetic diaphragm provides a sealing means, (j) said sealing means provides a gas tight seal between said first and second magnetic coupling member, and (k) said driving means comprises a crank pin of a compressor.

2. The combination set out in claim 1 wherein; (a) an enclosure for hermetically sealing said compressor is provided, and (b) said compressor is mounted on resilient means within said enclosure.

3. The combination set out in claim 2 wherein; (a) a flat rectangular member is mounted for rotation with said crank pin, and (b) said flat member includes a square bore extending axially therethrough.

4. The combination set out in claim 3 wherein said diaphragm member includes; (a) a thickened hub portion, (b) a shaft means extending axially through said hub portion in gas tight relationship therewith, and (c) thrust bearing means mounted on said shaft means in abutting relationship with said thickened hub portion.

5. The combination set out in claim 4 wherein said resilient spring means comprises; (a) coils of wire, and (b) said wire has a square cross-section.

6. The combination set out in claim 5 wherein; (a) said driven means is rotatably attached to a fan.

7. A hermetically sealed compressor and means driven thereby including; (a) a shell means forming a hermetic enclosure in which said compressor is disposed, (b) a resilient means driven by said compressor, said resilient means being disposed in said hermetic enclosure, (c) a first magnetic coupling means disposed in said hermetic enclosure and fixed to rotate with said resilient means, and (d) a second magnetic coupling means disposed outside said hermetic enclosure and driven by said first magnetic coupling means for providing a power takeoff for drivingly rotating a drivingly rotatable means attached thereto.

8. The hermetically sealed compressor and means driven thereby of claim 7 wherein; (a) said compressor is resiliently mounted in said shell means, and (b) said resilient means driven by said compressor includes axially extending tangs so that said resilient means driven by said crank pin tends to center said compressor within said hermetic enclosure.

* * * * *